United States Patent Office 3,325,453
Patented June 13, 1967

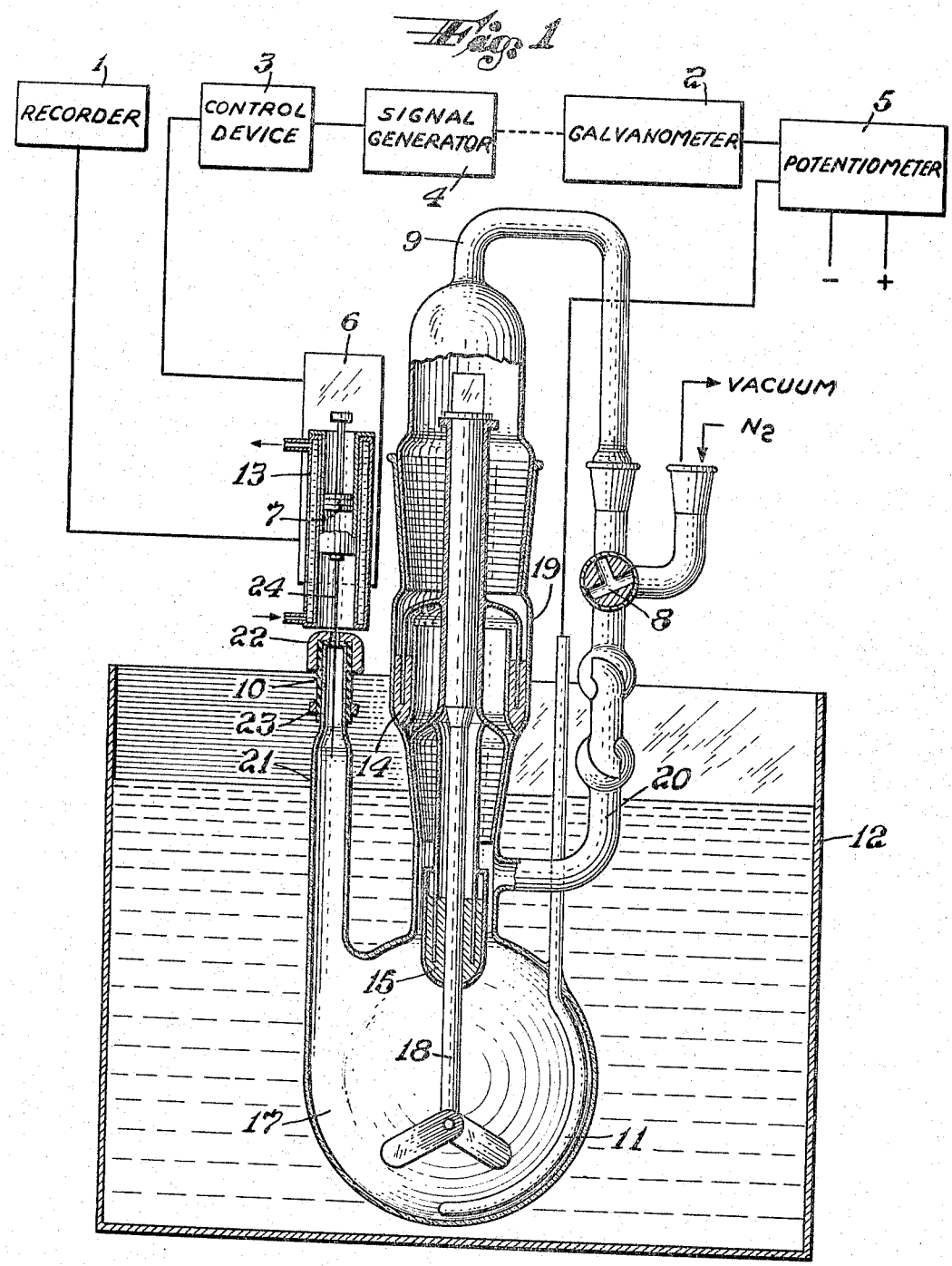

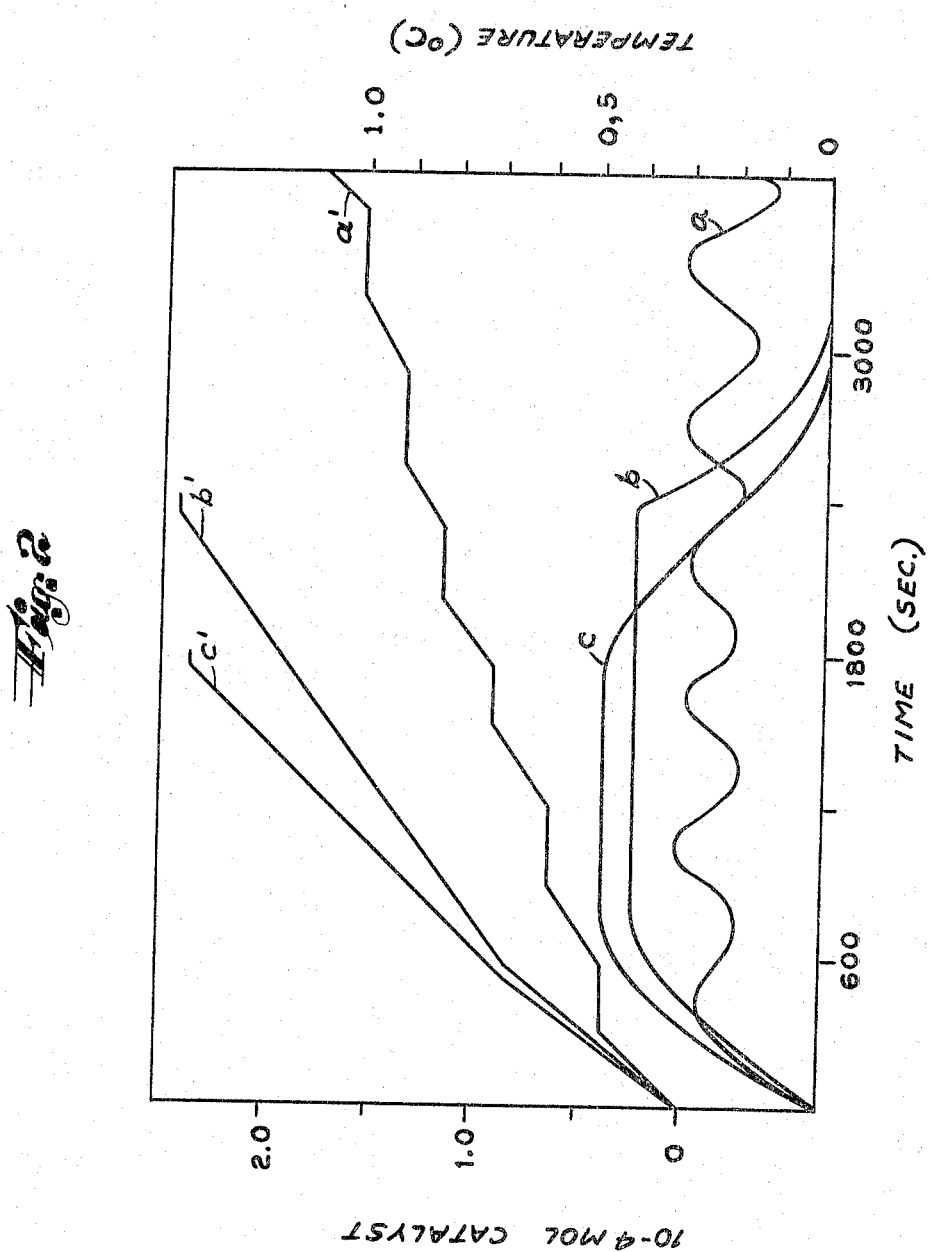

3,325,453
POLYMERIZATION METHOD WHEREIN THE RATE OF INITIATOR ADDITION IS DEPENDENT ON THE REACTION TEMPERATURE
Drahoslav Lím, Jiří Čoupek, and Miloslav Kolínský, all of Prague, Czechoslovakia, assignors to Československá akademie věd, Prague, Czechoslovakia
Filed Oct. 11, 1963, Ser. No. 315,546
5 Claims. (Cl. 260—63)

This invention relates to the addition polymerization of organic monomers, and more particularly to the chain polymerization of such monomers initiated by free radicals. As employed in this specification and in the appended claims, the term "polymerization" will be understood also to include copolymerization where appropriate.

It is conventional to initiate or catalyze the chain polymerization of monomers with initiators and catalysts initially present in a large excess. A steady state in which the polymerization proceeds at a fixed rate is reached at an early stage of the polymerization process, and this rate of polymerization is maintained almost to the completion of the polymerization reaction. Such steady state operation has been considered heretofore to be essential if uniform, homogeneous polymers are to be produced in a safe manner.

Adequate control of the polymerization reaction still is not available with the known process in large scale operation or block polymerization or in the preparation of pre-polymers containing solutions of polymer in unreacted monomer which are valuable intermediate technical products. In the presence of the required large amount of catalyst, the heat of polymerization not adequately dissipated from a large body of polymerization mixture may cause localized polymerization at an explosively accelerating rate, and may cause series accidents to plant and personnel.

The steady state operation of the conventional chain polymerization process is predicated on maintenance of a temperature at which the catalyst or initiator decomposes steadily over the entire polymerization period to furnish the required radicals or ions, and the "steady state temperature" for each particular batch of monomer and catalyst is narrowly defined by the nature and quantity of the monomer and of the catalyst. The polymerization mixture initially must contain a large store of catalyst or initiator. Undecomposed catalyst or initiator must still be present upon completion of the polymerization, as will presently become apparent. The process is inherently wasteful of catalyst or initiator.

We have found that the disadvantages of steady state operation can be avoided, and that polymerization can be carried out with better control and improved safety, if the polymerization is carried out at a temperature higher than that which would be determined by considerations of steady state operation, and by gradually adding an initiator to the polymerization mixture. In its more specific aspects, the invention provides for polymerization by means of a free-radical initiator at a temperature at which the initiator decomposes virtually completely within a period of one to thirty minutes. The rate of initiator supply to the reaction mixture is controlled responsive to the temperature of the latter.

The initiators most suitable for the polymerization process of the invention are those which yield active particles, that is, free radicals, by a substantially unimolecular reaction, the preferred initiators being those which decompose rapidly at temperatures not substantially higher than 120° C. Compounds containing a peroxide linkage or azo-type linkages between nitrogen atoms are typical of the classes of initiators which are used to best advantage for the process of the invention. Many such compounds are known, such as the peroxy-acetals, the organic and inorganic peroxides and peroxyacids. Other classes of compounds which furnish useful initiators for the process of the invention include the esters of hyponitrous acid, particularly the alkyl esters of hyponitrous acid, organic azo compounds, azides, and the like.

It is generally desirable to perform the process of the invention at the lowest possible temperature in order to avoid chain transfer reactions which would cause branching of the polymer chain and other irregularities. The preferred initiators are therefore those which decompose and yield active particles at temperatures below the desirable limit of 80° C.

The initiator concentration in the reaction mixture may be held much lower than in conventional processes which cannot maintain a uniform concentration of active particles over the polymerization period unless the concentration of the initiator remains substantially the same over this period. Expressed differently, the amount of initiator originally supplied must be such that it is not significantly reduced by the decomposition of a portion thereof to form the radicals necessary to initiate polymerization. In the process of this invention, only as much initiator is added to the polymerization mixture as is instantaneously needed to furnish the active particles, and the total amount of initiator employed is only a fraction of that necessary in the conventional method.

In the absence of a large amount of initiator compound, explosive localized polymerization is impossible. The rate of polymerization can be controlled by varying the rate of initiator supply, and the polymerization mixture can readily be held in a stable condition. The better control over polymerization conditions results in a narrower distribution of molecular weights in the polymer formed.

The conventional process is largely controlled by the supply or the withdrawal of thermal energy. The heat conductivity of the usual polymerization mixtures is low, and the rate of heat transfer to heat exchange surfaces is unfavorable. It is therefore very difficult to maintain a uniform temperature in a polymerization mixture of a bulk practical for manufacturing purposes. The thermal inhomogeneity of the polymerization mixtures in the known processes is reflected in a relatively wide distribution of molecular weights in the polymer formed. Under otherwise comparable conditions, the method of the invention yields a product of more uniform molecular weight.

The polymers produced by the process of this invention are practically free of undecomposed initiator compound, whereas such compound is inherently present in conventionally prepared polymers in appreciable amounts. The absence of the initiator compound improves the stability of the polymer, as well as its electrical properties.

The process of the invention requires vigorous agitation of the polymerization mixture if high uniformity of the product is desired. It is not necessary, however, to maintain uniform conditions of temperature and composition throughout the mixture as long as every portion of the mixture passes through approximately the same cyclic sequence of temperatures and compositions. The method thus requires that the polymerization mixture be maintained in a state of reasonable fluidity. Such a state is readily maintained in solution, emulsion, or precipitation polymerization. In the absence of a liquid diluent, the method of the invention may be used successfully for producing pre-polymers consisting of a polymer dispersed or dissolved in its liquid monomer.

The temperature of any portion of the polymerization mixture may be controlled within very narrow limits in the method of this invention. The temperature sensitivity of the thermostatic controls employed should be about 0.1° C., and devices meeting this requirement are readily available. The very small amounts of initiator which are supplied to large bodies of polymerization mixture in the process of this invention are more conveniently metered and dispersed when diluted with an inert solvent or with additional amounts of cold monomer prior to being fed to the polymerization vessel. The dilution of the polymerization mixture by a solvent introduced with the initiator counteracts the rise in the viscosity of the latter with progressing polymerization. When additional monomer is introduced into the polymerization with the initiator, and it is desired to produce a pre-polymer, the process of the invention can be carried out continuously. The pre-polymer is withdrawn from the polymerization vessel at a rate corresponding to the rate of supply of the monomer. The continuous process may be carried out for all types of polymerizations.

Other features and many of the attendant advantages of this invention will be readily appreciated as the same becomes better understood by reference to the following detailed description of specific embodiments when considered in connection with the accompanying drawing wherein:

FIG. 1 illustrates preferred apparatus for carrying out the process of the invention in a laboratory scale in an elevational sectional, and partly diagrammatic view; and FIG. 2 graphically represents relationships of certain process variables in the method of the invention.

Referring initially to FIG. 1, there is seen a multiple-neck round-bottom glass flask 17 equipped with a stirrer 18 journaled in a central neck 19 of the flask 17 and equipped with two mercury seals 14, 15. One side neck 20 is provided with a three-way stopcock 8. One of the branches of the stopcock 8 is arranged to be alternatingly connected to a source of pure gaseous nitrogen and to a high-vacuum pump in a conventional manner, not illustrated in the drawing. A U-tube 9 releasably connects another branch of the stopcock to the central neck 19 so as to seal the top of the stirrer 18.

Another side neck 21 of the flask 17 is closed by a membrane 10 of acrylonitrile rubber held in place by a metal cap 22 and a ring 23. A central opening in the cap 22 permits the insertion of the needle 24 of a syringe 7 whose cylinder is provided with a cooling jacket 13. A thin-walled tube 11 fused into the flask 17 holds a battery of ten copper-Constantan thermocouples for sensing the temperature of the contents of the flask 17.

The flask is immersed in a tank 12 which is part of a conventional thermostat arrangement not otherwise shown. It will be understood that the tank is equipped with an electric heating coil, a cooling water coil, a stirrer, and a temperature-sensitive switch which opens a solenoid valve in the cooling water circuit when the temperature in the tank 12 exceeds a first predetermined temperature, and closes the valve at a second temperature lower than the first one. The switch inversely energizes the heating coil at the second temperature and shuts the heating coil off at the first temperature, as is entirely conventional.

The flask is equipped with conventional controls for the automatic supply of catalyst from the syringe 7 in response to the temperature sensed by the thermocouples in the tube 11. The output of the thermocouples is fed to a potentiometer 5 supplied with a standard voltage as indicated by + and − signs, and equipped with a temperature-recording galvanometer 2. A signal generator 4 mechanically connected to the galvanometer 2 generates a signal when the sensed temperature is lower than a temperature which may be set on the recorder. The signal of the generator 4 is led to the initiator feed control device 3. The syringe 7 is provided with an actuator 6 which is controlled by the control device 3. The total amount of initiator supplied is recorded as a function of time by a recorder 1 connected to the actuator 6. The control-device may be of the impulse-type, the length of the period being dependent on the difference between temperatures in the flask and basic temperature.

When it is desired to carry out a polymerization in the flask of FIG. 1, the syringe 7 is filled with initiator or initiator solution, and the monomer or monomer solution, emulsion, etc. is introduced into the flask 17. Atmospheric oxygen is removed from the flask 17 by several cycles of operations, each involving cooling with liquid nitrogen, evacuating to a pressure of $10^{-4}$ mm. Hg, filling with pure nitrogen, and heating to room temperature. It is necessary that the U-tube 9 be held in the illustrated position during purification of the flask so that the same pressure is maintained on both sides of the mercury seals. Oxygen can be also removed by introducing a stream of gaseous pure nitrogen into the apparatus before the reaction.

After the removal of oxygen, the flask is immersed in the thermostat tank 12, the U-tube 9 is removed, and the stirrer 18 is connected to a drive motor. The automatic controls for the supply of initiator are then energized, and initiator feeding to the monomer in the flask 17 is stated at a rate which may be adjusted on the controls.

Polymerization sets in, and thermal energy is set free as double bonds of the monomer are saturated by the polymerization. The temperature of the contents in the flask 17 tends to rise. Simultaneously, a rise in the temperature of the polymerization mixture causes heat transfer to the thermostat bath, and partly counteracts the thermal effect of polymerization to an extent depending on such factors as the configuration and the dimensions of the flask 17. When the temperature in the flask is reaching a desired level, higher than the temperature of the thermostat tank 12, the supply of initiator is at first progressively reduced and finally shut off. When the temperature in the flask 17 drops below the desired temperature, initiator feeding is resumed first at a reduced rate and afterwards at the set rate. When the amount of initiator originally supplied is consumed, polymerization comes to a halt.

Characteristic curves obtained on the recorders 1 and 2 in three different runs of the apparatus of FIG. 1 are superimposed in the graph of FIG. 2. The curves $a$, $b$, $c$, are plots of sensed temperature versus time, the temperature being recorded as the ordinate in degrees centrigrade above an arbitrary base temperature. The time is recorded as the abscissa on a uniform scale in seconds starting at the beginning of polymerization. The corresponding curves $a'$, $b'$, $c'$, represent the total amount of initiator added as the ordinate with respect to the same time abscissa. The data on added initiator are recorded in units of $10^{-4}$ mol.

The curves $a$ and $a'$ are representative of a run at relatively high feeding rate combined with a low temperature setting for the signal generator 4. The temperature varies cyclically so as to produce an undulating temperature vs. time curve. The total amount of initiator increases stepwise with time. At relatively low rates of initiator supply and relatively high temperature settings for the signal generator 4, the individual cycles of the control system are so short that smooth recording lines are produced, and both the temperature and the rate of initiator supply are substantially constant over a substantial portion of the polymerization period as is seen from curves $b$, $b'$, $c$, $c'$. Similar arrangement may be used also in case of large scale operations.

The following examples are further illustrative of the process of the invention, and it will be understood that the invention is not limited thereto.

*Example 1*

100 parts (by weight) methyl methacrylate were mixed with 0.005 part cetyl hyponitrite dissolved in 7 parts of toluene at such a rate that the temperautre in the reaction vessel was maintained at a temperature of 80° C.± 0.035° C. When the feeding of initiator solution was stopped, a conversion of 30 percent of the monomer had been reached. The prepolymer so produced is a varnish base or cement ingredient. It did not contain any residual polymerization initiator which could yield active particles over a period of time. The prepolymer thus is distinguished by its stability and long storage life from similar products prepared by conventional methods using a benzoyl peroxide initiator.

*Example 2*

The polymerization vessel was charged with a solution of 100 parts acrylonitrile in 500 parts heptane. A solution of 0.01 part cetyl hyponitrite in 2 parts cetane was gradually metered into the vessel at such a rate as to maintain the temperature of the polymerization mixture at $70°\pm0.1°$ C. The polymerization was completed after one hour during which uniform process conditions were maintained. The polymer precipitated from the liquid phase was filtered with the aid of a suction pump in the usual manner, washed, and dried.

*Example 3*

100 parts styrene were polymerized by gradual addition of a solution of 0.02 part dimethyl-2,2'-azoisobutyrate in one part styrene. The addition of initiator was controlled at such a rate that a temperature of 100° C. was maintained. When the conversion of the styrene in the vessel to the polymer had reached 40 to 50%, feeding of the initiator solution was stopped. The prepolymer formed was then subjected to thermal block polymerization. It may also be used for other purposes, as is known in itself.

While esters of hyponitrous acid and of azo-isobutyric acid only have been mentioned in the illustrative specific examples chosen for the purpose of the disclosure, those skilled in the art will readily modify these examples to substitute other monomers and other initiators without departing from the spirit of this invention. The following monomer are further illustrative of the monomers having olefinic double bonds which are suitable for the process of the invention:

Ethylene, tetrafluorethylene, trifluorchlorethylene, vinyl chloride, butyl methacrylate, vinylidene chloride, isoprene, butyl acrylate, phenyl methacrylate, vinyl acetate, benzyl methacrylate, methyl acrylate, methyl vinyl ketone, styrene and its derivatives, methacrylonitrile.

Typical additional compounds yielding ions or free radicals in an obvious manner when employed in the aforedescribed process include:

Diisopropyl peroxydicarbonate, benzene sulfonyl-peroxide, di-tert.-butyl monoperoxalate, N-phenyl, O-tert.-butyl peroxycarbamate, methyl-ethyl-ketone hydroperoxide, bis-isobutyryl hyponitrite, $\alpha,\alpha'$-azo-bis-$(\alpha,\gamma$-dimethyl-$\gamma$-ethoxyvaleronitrile), $\alpha,\alpha,'$-azo-bis-($\alpha$-phenyl propionitrile), $\alpha,\alpha'$-azo-bis-(isobutyronitrile), benzoyl peroxide, butyl lithium+methylmethacrylate.

It is characteristic of the catalysts listed that they are capable of undergoing first order or monomolecular reactions in which free active particles, namely free radicals or ions, are formed. The reactions involve the thermal decomposition of a molecule in which two or more free radicals are formed, or the dissociation of a Lewis acid in which a complex anion and a proton (or carbonium cation) are formed.

If it is desired to obtain a polymer having uniform quality, the temperature in the process of our invention should be controlled so as to be constant. This is possible only if the rate of catalyst supply is quite low relative to the contents of the polymerization vessel, and if the sensitivity of the automatic system which controls the catalyst supply responsive to the temperature of the polymerization mixture is high. Both conditions are readily met, and polymerization is then carried out under uniform conditions maintained by the thermal inertia of the polymerization mixture even if the catalyst supply is not strictly continuous.

The apparatus illustrated in FIG. 1 is readily provided with an overflow arrangement which then permits the polymerization process to be carried out continuously to the pre-polymer stage. In such a continuous process, the catalyst is fed to the polymerization zone in the form of a dilute solution in the monomer. The catalyst solution is kept at a temperature sufficiently low to prevent decomposition of the catalyst before it enters the polymerization vessel. The apparatus of FIG. 1 may be employed for polymerization of a monomer dispersed in an inert liquid diluent, the catalyst being added as a dilute solution in the diluent which maintains the viscosity of the mixture at the desired low value. The modified apparatus may be employed for the same purpose, and a mixture of diluent and partly polymerized material may be continuously withdrawn at the same rate at which the catalyst solution is supplied.

While the invention has been described with particular reference to specific embodiments, it is to be understood that it is not limited thereto, but is to be construed broadly and restricted solely by the scope of the appended claims.

We claim:

1. A method of polymerizing a monomer having an olefinic double bond and capable of addition polymerization in which said bond is saturated which comprises:
   (a) gradually admixing to said monomer, while said monomer is in a liquid state in a polymerization zone, an initiator compound capable of substantially unimolecular thermal decomposition in the mixture so produced to form radicals initiating said polymerization,
   (1) whereby polymerization of said monomer is initiated and heat of polymerization is developed;
   (b) continuously withdrawing heat of polymerization from said mixture; and
   (c) controlling the rate of admixture of said initiator compound to said monomer in response to the temperature of said mixture to keep said temperature at a substantially constant value at which said thermal decomposition of said initiator compound is substantially complete within one to thirty minutes in said mixture, and said monomer is at least partly polymerized to a corresponding addition polymer.

2. A method as set forth in claim 1, wherein said initiator compound is diluted with an amount of said monomer to form a dilute initiator solution and is admixed to the monomer in said zone as said solution jointly with said amount of monomer, and said mixture is removed from said zone at substantially the same rate at which said solution is being admixed to the monomer in said zone, said temperature of the mixture in said zone being high enough to keep the mixture liquid during said polymerization, and said compound being diluted with said amount of monomer at a temperature lower than the temperature of said mixture.

3. A method as set forth in claim 1, wherein said monomer is methyl methacrylate, acrylonitrile, styrene, ethylene, tetrafluoroethylene, trifluorochloroethylene, vinyl chloride, butyl methacrylate, vinylidene chloride, isoprene, butyl acrylate, phenyl methacrylate, vinyl acetate, benzyl methacrylate, methyl acrylate, methyl vinyl ketone, or methacrylonitrile.

4. A method as set forth in claim 1, wherein said monomer in said zone is dispersed in a liquid diluent, and said initiator compound is diluted with an amount of said diluent prior to being admixed to said monomer in said zone.

5. A method as set forth in claim 1, wherein said monomer is liquid prior to the admixture of said initiator compound and capable of forming a solid polymer, and additional amounts of said monomer are fed to said zone jointly with said initiator compound for maintaining the mixture of monomer and polymer formed in said zone during polymerization in a liquid condition.

(References on following page)

References Cited

UNITED STATES PATENTS

| | | | | |
|---|---|---|---|---|
| 2,497,828 | 2/1950 | Young | | 260—95 |
| 2,590,539 | 3/1952 | Hudson | | 260—683.15 |
| 2,656,341 | 10/1953 | O'Alelio | | 260—95 |
| 2,904,541 | 9/1959 | Barrett | | 260—95 |
| 3,035,033 | 5/1962 | Schweitzer et al. | | 260—95 |
| 3,074,920 | 1/1963 | Henderson | | 260—95 |

JOSEPH L. SCHOFER, *Primary Examiner.*

HARRY WONG, Jr. *Assistant Examiner.*